April 20, 1954   M. A. MOSKOVITZ   2,676,045
LUBRICANT-SEALED TIE ROD JOINT
Filed July 9, 1951
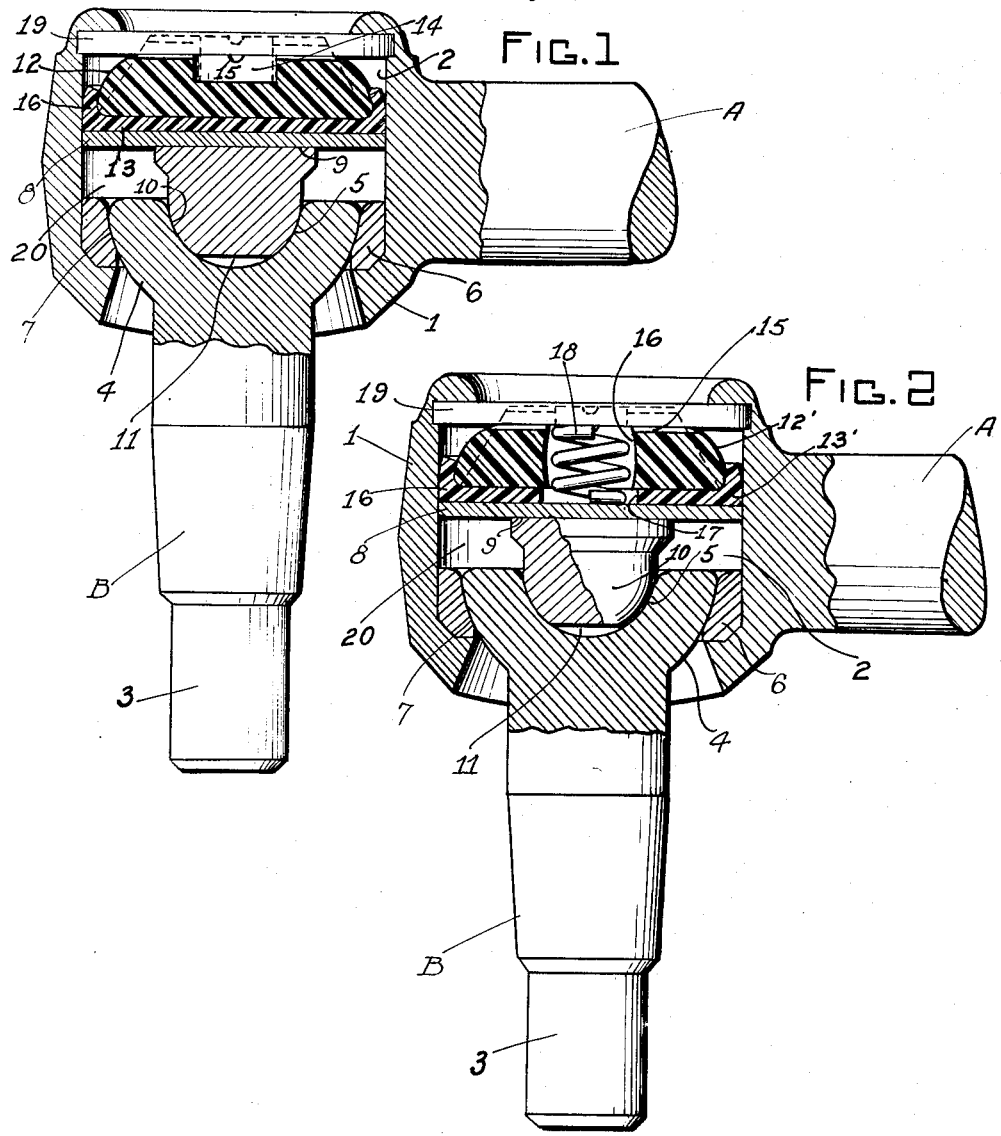
INVENTOR
MILTON A. MOSKOVITZ
By: Ben V. Zillman
ATTORNEY Patented Apr. 20, 1954

2,676,045

UNITED STATES PATENT OFFICE 2,676,045

LUBRICANT-SEALED TIE ROD JOINT

Milton A. Moskovitz, Richmond Heights, Mo., assignor of one-half to Harry Frankel, St. Louis, Mo.

Application July 9, 1951, Serial No. 235,780

13 Claims. (Cl. 287—85)

This invention relates to improvements in tie-rod joints and more especially to such a joint that will be self-compensating for wear between its parts, relatively simple to make and install, give excellent and carefree service over long periods of time, and which will be otherwise safe, satisfactory and efficient for use wherever deemed applicable.

A principal object of the invention is to make use of rubber or rubber-like material to maintain the movably interconnected parts in their assembled relationship, taking advantage of the fact that different physical characteristics of different rubber-like materials can be employed to best purposes in such a joint.

A further object of the invention is to so use rubber-like materials of the kind aforesaid, that true rubber or rubber-like materials are employed solely to provide the force or thrust required to maintain the parts in their intended relationship, but that an oil-resistant synthetic rubber is used where it is apt to encounter the lubricant sealed within the joint, for the reason that natural rubber will stay elastic for much longer periods than the synthetic rubber and has less tendency to take a compression set through service.

Another object of my invention is to so construct a device of the kind described, that air will not become so entrapped within the device as to become sufficiently compressed to add its pressure to that of the rubber member that is intended for pressure purposes.

A still further object of the invention is to so construct a tie-rod joint wherein the stud member of the joint will have a cavity in its rounded head, to receive a button element which transmits the axial thrust from the pressure member to said rounded head, there being a space provided between the bottom of said cavity and the adjacent portion of the button, to form a sediment-receiving well when and if such sediment forms.

An added object of my invention is to so construct a device of the kind described, employing rubber load-transmitting means and with an additional metal spring means for that purpose too, the spring means being independent of the rubber means, but both means building up into the full cumulative thrust required, thus relieving the rubber of sufficient of the load to minimize its tendency to take a compression set in service, while getting substantially the full vibration-dampening effect of said rubber, and getting the safety of the spring, to together enable the device to better insure its ability to transmit and absorb the load at all times.

Many other objects and advantages of the construction herein shown and described, will be obvious to those skilled in the art to which this invention appertains, as will be more clearly apparent from the disclosures herein given.

To this end, my invention consists in the novel construction, arrangement and combination of parts herein shown and described, and as will be more clearly pointed out in the following specification.

In the drawings, wherein like reference characters represent like or corresponding parts throughout the views, Figure 1 is a cross-sectional view, with parts broken away and in elevation, showing one form of my invention; and Figure 2 is a similar view of a modified form of the same.

Referring more particularly to the drawings, wherein I have illustrated the preferred embodiments of my invention, there is shown a tie-rod joint of the type used in the construction of a motor vehicle at one or more points where a pair of relatively movable parts are interconnected. One of the members comprises the member A, at one end of which there is a tubular enlargement 1 to form a housing or casing through which there is a bore or opening to provide the socket 2.

The other member B, that cooperates with member A to form a ball and socket joint, comprises a stud portion 3, the upper end of which is enlarged and rounded to provide a fragmentary spherical or ball end or head 4, whose maximum diameter is sufficiently larger than the lowermost opening of said socket to prevent said ball end falling therethrough, and thus requiring that the stud being inserted into its operative position through the upper and larger end of said bore of the socket.

In addition to this externally rounded or fragmentally spherical surface of the ball head of the stud, the same is centrally recessed with a fragmentally spherical opening 5, the center of curvature of this last-mentioned cavity being identical with that of the outer convex surface of said head so that both of said spherical surfaces are concentric.

A bushing 6 is pressed or otherwise firmly fixed within the socket chamber and is provided with a concave seat 7 of the same curvature as that of the complemental surface of the ball head 4 so that the latter will seat smoothly and accurately in said bushing. This bushing material may be such that it can be initially impregnated with a powdered lubricant if so desired.

A pressure element, such as the disk or plate 8 is mounted above said head end of the stud and is movable axially of said stud, within the socket chamber. A second pressure element coacts with said first element 8 and may be in the form of a button or dome having a flat or planar face 9 bearing against the under planar face of said element 8, and is also provided with a convex or semi-spherical face 10 truncated in form, and complemental to the rounded surface of the cavity 5, it being noted that the height or thickness of this button is sufficiently less than the depth of the cavity 5 to leave a space or well 11 between the flattened bottom of said button and the bottom of said cavity, and into which any grit or sediment may become entrapped as it arises. If desired, some graphite or the like may be placed within said cavity at the assembling of the joint members. Obviously, any pressure downwardly on the composite pressure means will be transmitted therethrough to urge the ball head toward its seat in the bushing and will force the button into its seat in said head cavity.

In order to constantly urge the members to seat in their respective bearings, I have provided a rubber or rubber-like means, preferably of a combination of both a natural rubber element 12 and an oil-resistant synthetic rubber element 13, both elements being yieldably and resiliently compressible, of course, in this instance.

The element 12 is preferably initially of the shape shown in dotted lines, and upon its installation within the assembly, will be compressed to its full-line shape and form to form the approximately truncated cone or frustum, said cone having its enlarged base lowermost and then decreasingly tapered toward its upper or smaller end. A recess or opening 14 is formed centrally into the plug 12 to tend to adjust the pressure under compression of the plug, and to make the upper end of the plug more flexible, and one or more ducts or grooves 15 extend from said central recess to the peripheral edge of the element. In the operation of the device, there will be a free passage of air from the central opening to either side of the plug; hence, the air pressure will not build up and act conjointly with the axial pressure of the rubber plug and be sufficiently great to rapidly deteriorate the parts thereat. Only the pressure of the plug will be of consequence and will be expected.

As previously stated, the plug should be of such shape that after it is properly compressed into the space within the socket chamber, by locking the closure disk 19 in place under pressure in any well-known manner, it will flow to the shape indicated in full lines, leaving the air ducts with free and unobstructed passage from within the recess of the plug to the exterior of the latter.

It is well-known that natural rubber is not as well adapted to stand up in the presence of oil contact, as certain artificial or synthetic rubbers, such as neoprene for example, and because of this I have interposed the resiliently compressible, oil-resistant synthetic rubber element 13 as shown, this element preferably being in the form of a cup provided with a peripheral flange 16 that extends longitudinally or axially of the socket. This element 13 is interposed between the element 12 and the pressure plate and between the element 12 and the inside peripheral wall surface of the socket, the flange being constantly pressed radially outwardly into snug engagement with said peripheral wall surface by the lower peripheral portion of the plug.

However, this outward pressure between the element 13 and the socket wall is not so great as to prevent axial movement of the element in the normal operation of the device. It merely resists this axial movement sufficiently to act as a damper to decelerate the rate of and amount of axial vibration or movement of the parts under shock.

By so combining the two kinds of rubber into the pressure means to hold the parts in their intended relationship in service, it is evident that the natural rubber will be elastic to a greater degree, and for a longer time, than the neoprene rubber, and will have a minimum tendency to go into a compression set, as compared with the latter. However, if lubricant were to come into contact directly with the natural rubber, the latter would rapidly deteriorate and become damaged and unsafe. In the manner indicated, the best advantages of each of the two kinds of rubber material comprising the composite compression means are made use of.

The space 20 within the chamber between the top of the ball head and the under side of the pressure disk may be filled with any suitable lubricant and the same will then be substantially permanently sealed in place thereafter.

In the modification shown in Fig. 2, the compression load to the ball head is divided between rubber and metal means, the rubber insert being somewhat similar to that just described, and with a metal coil spring that is independent of the rubber but acting in conjunction therewith to increase the factor of safety of the device in the event that there is a failure of the rubber through any cause. This also serves to lighten the compression load that is required of the rubber, thereby prolonging the life of the latter and acting to decelerate its tendency to take a compression set in service.

In said modification, the plug 12' and the cup 13' are formed with central openings 16 and 17 respectively, that are in axial registry or alignment when the parts are in their assembled relationship as shown in Fig. 2, said openings defining a clear and unobstructed axial opening between the closure disk and the pressure plate. A metal spring 18 that is in the form of a coil, is arranged with its axis approximately coincident with the axes of said openings in alignment, and is placed there under an initial compression between said closure disk and the pressure plate so as to constantly exert pressure axially between the same. Obviously, the division of pressure of the total thrust to the ball head, may be as desired, with equal or unequal proportions of such load being taken up by the spring means and rubber means respectively, as found most suitable for the particular problem at hand. In either event, the compression load on the rubber means will be lightened by such proportion of the total thrust load as the spring takes, so that there will be less tendency for the rubber to take a compression set, and in addition, the spring will always remain as a reserve, operative to take up the load entirely, if and when the rubber fails through any cause.

Also, substantially all of the vibration-dampening effect of the rubber means will be retained in this modification and be as efficient in service as in the form previously described. Further, with such a combined rubber and metal combination taking the load, the rubber will act to minimize noise of vibration of the parts as compared with the use of metal springs acting alone.

Having thus disclosed my invention, it is obvious that various immaterial modifications may be made in the same without departing from the spirit of the invention; hence I do not wish to be understood as limiting myself to the exact form, arrangement, combination of parts and construction thereof, except as limited by the state of the art to which this invention appertains, and by the claims hereunto appended.

What I claim as new and desire to secure by Letters Patent is:

1. A ball and socket type joint comprising a housing having a lubricant-receiving socket, a closure element across one end of said socket, a stud having a rounded head tiltable and rotatable within said socket, a pressure-transmitting member movably operable within said socket and defining an end wall of a lubricant-receiving chamber within said socket, a resiliently compressible rubber plug held compressed within said socket between said closure element and pressure-transmitting member, and an oil-resistant compressible synthetic rubber element in said socket between said pressure-transmitting member and plug and having a portion expandible radially outwardly by said plug into sealing contact with the bounding wall of said socket to prevent lubricant leakage therepast.

2. A ball and socket type joint comprising a lubricant-receiving socket member, a stud having a rounded head end tiltable and rotatable within said socket member, a resilient rubber plug held compressed within said socket member to be contantly urged toward said head, and a yieldably compressible oil-resistant synthetic rubber element in said socket member between said plug and the peripheral inside bounding wall of said socket member and pressed radially outwardly by said plug into sealing engagement with the peripheral bounding wall of said socket member to prevent lubricant leakage therepast.

3. A ball and socket type joint comprising a housing having a socket therein, a stud having a rounded head tiltable and rotatable within said socket, a pressure-transmitting member movable toward said head within said socket, a closure for an end of said socket, and yieldably compressible rubber-like means within said socket between said closure and pressure member held compressed to constantly press the latter toward said head, said means having an axially extending peripheral flange that is constantly pressed into engagement with said socket wall.

4. In a joint of the kind described, the combination with a pair of relatively movably connected members one of which has a rounded head and the other of which has a socket to receive said head, and a pressure-transmitting plate movable axially in said socket and forming a lubricant-receiving chamber in the latter together with said head, said rounded head having a rounded cavity in its end opposed to said plate, a button element fitting between the wall of said cavity and the plate and having a planar surface transversely slidably engageable with the latter and having a rounded portion fitting into said cavity and being sufficiently shallower than said cavity to provide a sediment-receiving pocket in the bottom of said cavity, and means for constantly pressing said plate toward said head.

5. A ball and socket joint comprising a housing provided with a socket, a closure element across one end of said socket, a stud having a rounded head and tiltable and rotatable within said socket adjacent the other end of the latter, a pressure-transmitting plate movable axially toward said stud within said socket and defining an end of a lubricant-receiving chamber in said socket between itself and said head, and rubber-like means held resiliently compressed within said socket between said closure element and said head to constantly press said plate axially toward said head, said means comprising portions of differing physical characteristics only one portion of which engages the socket wall and is of an oil-resistant synthetic rubber, while another portion of said means has sufficiently greater resilient compressibility and thickness than said first portion to exert the major portion of the total thrust urging said plate toward said head.

6. A ball and socket type joint comprising a housing provided with a socket, a closure element at one end of said socket, a stud having a rounded head tiltable and rotatable within said socket adjacent the other end of the latter, a pressure-transmitting plate movable axially toward said stud within said socket and defining an end wall of a lubricant-receiving chamber in said socket, a compressible oil-resistant synthetic rubber cup in said socket and having a peripheral flange slidably engaging the peripheral wall of said socket, and a rubber plug compressed within said socket between said closure element and cup and constantly pressing the flange of the latter radially outwardly against the peripheral wall of the socket and constantly pressing said plate toward said head, said plug being more highly resiliently compressible than said cup.

7. In a tie rod joint comprising a ball end member and a socket for movably receiving the same, and a closure element for one end of said socket member, of a pressure plate movable within said socket member to seat said ball end member therein, a substantially frusto-conical rubber-like plug held resiliently compressed within said socket member to constantly urge said plate toward said ball end member, and an oil-resistant synthetic rubber member interposed between said plate and the peripheral wall of the socket member and encircling said plug to hold the latter spaced from said peripheral wall of the socket member, said plug occupying the major part of the distance between said closure element and the plate to exert the main thrust urging said plate toward said ball end member.

8. A ball and socket type joint comprising a housing having a socket therein, a stud having a rounded head tiltable and rotatable within said socket, a closure element closing one end of said socket, a pressure plate movable in said socket toward said head, a substantially frusto-conical rubber-like plug held resiliently compressed in said socket to constantly urge said plate toward said head, and an oil-resistant synthetic rubber cup interposed between said plate and plug and having a peripheral flange extending axially and providing a seat for the enlarged end of the plug, so that when said plug is compressed into its normal position it will press said flange radially outwardly into sealing contact with the peripheral wall of the socket, said plug being sufficiently thicker than said cup to exert the major portion of the total thrust urging said plate toward said head.

9. In a tie rod joint comprising a member having a rounded head and a socket member movably receiving the same, and a closure element closing one end of said socket member, a pressure plate movable within said socket member toward said head, a substantially frusto-conical rubber-like plug held resiliently compressed within said socket member to urge said plate toward said head and having an opening adjacent one end to increase its flexibility thereat and provided with grooves extending from said opening to the peripheral edge of the plug, said grooves being sufficiently deep to remain open throughout when the plug is compressed into normal operating position within the socket member, and an oil-resistant synthetic compressible rubber cup between said plate and plug and forming a seat for the enlarged end of the latter and whereby said plug constantly presses said flange radially outwardly into sealing engagement with the peripheral bounding wall of the socket member.

10. A ball and socket type joint comprising a housing having a socket, a closure element at one end of said socket, a stud having a rounded head tiltable and rotatable within said socket, a pressure-transmitting member movable within said socket, a resiliently compressible rubber plug maintained compressed within said socket to constantly press said member toward said head, and a spring between said closure element and pressure member and independent of said plug to directly and additionally press said pressure member toward said head.

11. A ball and socket type joint comprising a housing member having a socket, a closure fixed across one end of said socket, a stud having a rounded head within said socket, a pressure plate movable toward said stud within said socket and defining one end of a lubricant chamber within said socket, a resilient rubber plug held compressed within said socket between said closure and plate to constantly press said plate toward said head, a spring between said closure and pressure plate and independent of said plug to additionally constantly press said pressure plate toward said head while said plug exerts its pressure thereagainst, and an oil-resistant synthetic rubber element in said socket between said pressure plate and the plug and having a circumferentially extending portion radially expandibly pressed by the latter into sealing contact with the peripheral wall of the socket to prevent lubricant leakage therepast.

12. A ball and socket type joint comprising a housing member having a socket, a stud having a rounded head rotatable and tiltable within said socket, a closure element across one end of the socket, a pressure member movable toward said head within said socket, a yieldably compressible rubber-like plug member within said socket between said closure element and pressure member and compressed into place to constantly urge said pressure member toward said head and having an opening therethrough, an oil-resistant synthetic yieldably compressible rubber cup member providing a seat for said plug and having its peripheral flange encircling the latter and pressed radially outwardly by the latter into sealing engagement with the peripheral socket wall and also having an opening in registry with said plug opening, and a spring in said registered openings and held constantly compressed between said closure element and pressure member to constantly exert pressure axially on the latter while said plug exerts its axial pressure on the same.

13. In a joint of the kind described having a pair of relatively movable interconnected members, a rounded head on one of said members and a socket on the other member to tiltably receive and seat said head and to provide a lubricant chamber, yieldably compressible means movable within said socket to constantly press said head towards its seated position, said means being spaced constantly from the enclosing side wall of said socket, and an oil-resistant synthetic rubber element encircling said means to sealingly engage said enclosing side wall of the socket and prevent lubricant passage therebetween.

References Cited in the file of this patent

UNITED STATES PATENTS

| Number | Name | Date |
|---|---|---|
| 2,379,011 | Laskin | June 26, 1945 |
| 2,461,626 | Booth | Feb. 15, 1949 |
| 2,477,447 | Fawick | July 26, 1949 |

FOREIGN PATENTS

| Number | Country | Date |
|---|---|---|
| 493,472 | Great Britain | Oct. 10, 1938 |